(12) United States Patent
Myers et al.

(10) Patent No.: US 12,037,880 B2
(45) Date of Patent: Jul. 16, 2024

(54) SYSTEMS AND METHODS FOR RESTARTING DOWNHOLE PUMP

(71) Applicant: Halliburton Energy Services, Inc., Houston, TX (US)

(72) Inventors: Matthew Myers, Tulsa, OK (US); Noel Johney, Tulsa, OK (US); Tom Yohanan, Broken Arrow, OK (US); Waylon David Whorton, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 340 days.

(21) Appl. No.: 17/446,324

(22) Filed: Aug. 30, 2021

(65) Prior Publication Data

US 2023/0066588 A1    Mar. 2, 2023

(51) Int. Cl.
| | | |
|---|---|---|
| *E21B 43/12* | (2006.01) | |
| *F04D 13/06* | (2006.01) | |
| *F04D 15/00* | (2006.01) | |
| *H02P 6/06* | (2006.01) | |
| *H02P 27/04* | (2016.01) | |

(52) U.S. Cl.
CPC ............ *E21B 43/128* (2013.01); *F04D 13/06* (2013.01); *F04D 15/0066* (2013.01); *H02P 6/06* (2013.01); *H02P 27/04* (2013.01)

(58) Field of Classification Search
CPC ...... F04D 15/0066; F04D 15/06; F04D 13/06; E21B 43/128; H02P 6/06; H02P 6/08; H02P 7/00; H02P 27/04; H02P 27/045
See application file for complete search history.

(56) References Cited

U.S. PATENT DOCUMENTS

| | | |
|---|---|---|
| 4,410,845 A | 10/1983 | Lockyear |
| 5,844,397 A | 12/1998 | Konecny et al. |

(Continued)

FOREIGN PATENT DOCUMENTS

| | | | |
|---|---|---|---|
| CN | 102822752 A | | 12/2012 |
| KR | 97017418 A | * | 4/1997 |
| WO | 2014143708 A1 | | 9/2014 |

OTHER PUBLICATIONS

International Search Report and Written Opinion dated May 13, 2022 for corresponding PCT Application No. PCT/PCT/US2021/048422 filed Aug. 31, 2021.

*Primary Examiner* — Philip E Stimpert
(74) *Attorney, Agent, or Firm* — K&L Gates LLP (57) ABSTRACT

Systems and methods of restarting a downhole pump for pumping downhole fluid and located in a wellbore that include determining a pump reverse rotational frequency of a downhole pump caused by downhole fluid flowing in a downhole direction using a phase locked loop. A pump motor is driven at a motor reverse rotational frequency matching the pump reverse rotational frequency. The pump motor is then driven to accelerate the pump reverse rotational frequency and thereby pump the downhole fluid in an uphole direction. The pump motor is then driven to decrease the pump reverse rotational frequency while continuing to pump the downhole fluid in the uphole direction. The pump motor is then driven to change the rotation of the downhole pump to a forward rotation at a pump forward rotational frequency to pump the downhole fluid in the uphole direction.

20 Claims, 4 Drawing Sheets

(56) References Cited

U.S. PATENT DOCUMENTS

| | | |
|---|---|---|
| 8,092,190 B2 | 1/2012 | Leuthen et al. |
| 9,735,713 B2 * | 8/2017 | Ek .............................. H02P 1/04 |
| 2008/0247880 A1 * | 10/2008 | Leuthen .............. F04D 15/0066 |
| | | 417/44.11 |
| 2016/0218657 A1 * | 7/2016 | Nondahl ................... H02P 6/21 |
| 2021/0025381 A1 * | 1/2021 | Orfanoudakis ....... E21B 43/128 |

* cited by examiner

SYSTEMS AND METHODS FOR RESTARTING DOWNHOLE PUMP

BACKGROUND

This section is intended to provide relevant background information to facilitate a better understanding of the various aspects of the described embodiments. Accordingly, these statements are to be read in this light and not as admissions of prior art.

Crude oil is typically produced by drilling wells into oil reservoirs and then pumping the oil out of the reservoirs through the wells. Often, the oil is pumped out of the wells using electric submersible pumps. Electrical power is provided to electrical drive systems at the surface of the wells and these drive systems provide the required electrical power to the downhole pumps.

While downhole pumps are designed to operate continuously, they are subject to interruptions that can result from a number of different causes. For example, changes in well conditions (e.g., the appearance of gas in an oil well) may cause the pump to stop operating. Interruptions or variations in the power supplied to a pump's drive system may also cause operation of the pump to be interrupted. Even if these interruptions in the operation of the pump are relatively short, they may nevertheless be very disruptive, particularly when the pumps are submersible pumps operated in deep wells.

These interruptions may be very disruptive because submersible pumps, which must fit in a well and must therefore be long and narrow, have very little inertia. Consequently, when there is a change in conditions that causes an interruption, these pumps slow down or stop very quickly in comparison to pumps that have more inertia, such as surface pumps. The deceleration of the pump is even more pronounced in deep wells due to the large fluid column above the pump. Normally, when the operation of the pump is interrupted for longer than about half a second, the pump will have begun to spin in a reverse rotational direction.

Typically, there is a speed below which the pressure produced by the pump is insufficient to support the column of fluid in the well. When the rotation of the pump falls below this speed, the fluid starts to fall back through the well and through the pump, causing the motor to backspin and dramatically increasing the torque required to resume forward rotation of the pump. The torque that can be generated by the pump system may be limited by such factors as the output of the drive for the pump motor, the impedance of the cable carrying the power downhole, etc., so restarting the pump motor may require more torque than the system can generate. It is therefore typically necessary to stop the pump and wait for the column of fluid to drain from the well before the pump can be restarted. The time required for the fluid column to drain back into the formation may take a few minutes in some cases, while in other cases it may take hours.

Normally, when it is necessary to restart a pump, an operator waits for a predetermined period and then restarts the pump. The wait period is typically determined by adding the amount of time necessary for the fluid to completely drain from the well and a safety margin (for example, an additional 25%). Because each well may normally produce hundreds or even thousands of barrels of oil in a day, the cost associated with the delay between the pump stopping and being restarted can be very high. There is therefore a need to minimize the delay between the time the pump stops and the time the pump is restarted.

In addition to the time and money loss, the torsion applied by attempting to resume the normal operational direction of the pump while in backspin can cause severe damage or failures to downhole equipment including shearing a shaft. This is directly related to the amount of torque applied to the pump/motor while the column of fluid in the well is driving the system in the backspin direction. There is therefore also a need to decrease the amount of torsion applied to the pump while in backspin.

BRIEF DESCRIPTION OF THE DRAWINGS

Embodiments of the systems and methods for restarting downhole pump are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

One or more embodiments of the invention are described below. It should be noted that these and any other embodiments described below are exemplary and are intended to be illustrative of the invention rather than limiting.

This disclosure is directed to systems and methods for using variable speed drives to restart downhole submersible pump motors that solve one or more of the problems discussed above. In the systems and methods, a downhole electric submersible pump deployed in a wellbore is controlled using a control system that includes a variable speed drive. The variable speed drive includes a control system that is configured to detect interruptions in the operation of the pump system. If the control system detects a power interruption or some other interruption that requires the restart of the pump motor, the control system initiates a restart process for the pump. In the restart process, the control system uses the variable speed drive to determine a pump reverse rotational frequency of the downhole pump caused by downhole fluid flowing in a downhole direction. The process also includes driving the pump motor at a motor reverse rotational frequency matching the pump reverse rotational frequency and then driving the pump motor to accelerate the pump reverse rotational frequency and thereby begin to pump the downhole fluid in an uphole direction. The process also includes driving the pump motor to decrease the pump reverse rotational frequency while continuing to pump the downhole fluid in the uphole direction. Finally, the process includes driving the pump motor to change the rotation of the downhole pump to a forward rotation at a pump forward rotational frequency to pump the downhole fluid in the uphole direction. Once rotating in the forward direction, the control system is further operable to drive the pump motor to increase the pump forward rotational frequency. The control system uses a phase lock loop to determine the pump reverse rotational frequency before driving the pump motor.

The various embodiments of the invention may provide a number of advantages over the prior art. For example, the present systems and methods may reduce the amount of time that is necessary before restarting the downhole pump. This reduction in time reduces the amount of lost production resulting from interruptions in the pump's operation. Still other advantages may also be provided.

Figure 1:
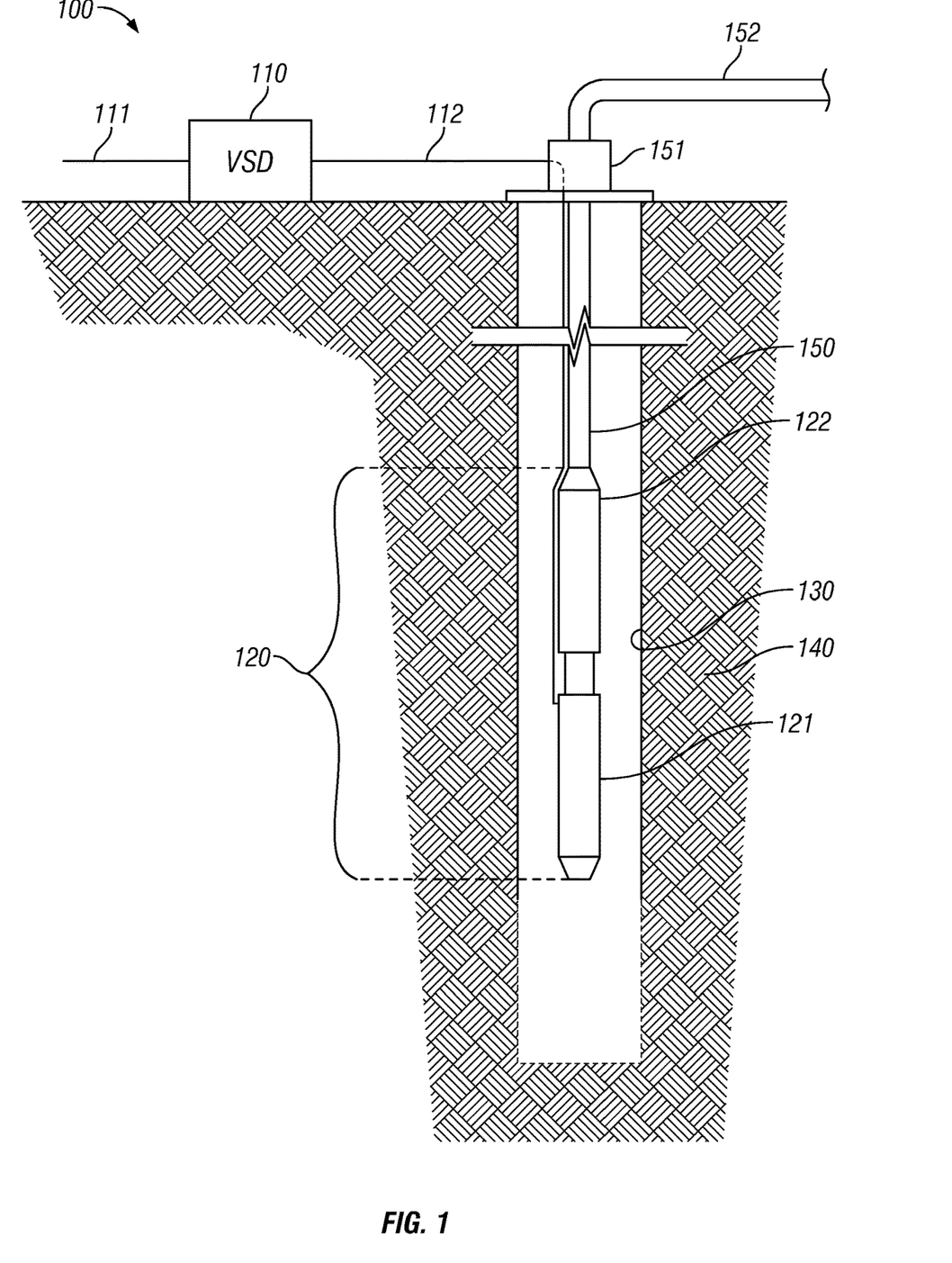
FIG. 1 is a schematic diagram illustrating a surface based electric submersible pump (ESP) system.

Turning now the figures, FIG. 1 is a schematic diagram illustrating a system 100 for pumping downhole fluid in a wellbore 130. The system 100 includes a variable speed drive 110 (VSD 110) that includes a control system and is coupled to an electric submersible pump assembly 120 (ESP assembly 120). The VSD 110 includes a variable speed drive (VSD) and the ESP assembly 120 is positioned within the wellbore 130 that has been drilled into an oil-bearing geological formation 140. The wellbore 130 is cased and is perforated at the lower end of the well to allow oil to flow from the formation 140 into the wellbore 130.

The ESP assembly 120 is coupled to the end of a production tubing string 150 and the ESP assembly 120 and the tubing string 150 are lowered into the wellbore 130 to position the ESP assembly 120 in a producing portion of the well (i.e., the perforated portion.) The ESP assembly 120 is then operated to pump a downhole fluid such as oil from the producing portion of the wellbore 130, through the tubing string 150 to a wellhead 151. The oil then flows out through production flow line 152 and into storage tanks (not shown in the figure.)

The ESP assembly 120 includes an electric motor 121 and a pump 122. (It should be noted that the ESP assembly 120 might include various other components that will not be described in detail because they are well known in the art.) The motor 121 is operated to drive the pump 122, which actually pumps the downhole fluid through the tubing string 150 and out of the wellbore 130. The motor 121 may be a two-pole, three-phase squirrel cage induction motor that operates to turn the pump 122. The pump 122 may be a multi-stage centrifugal pump including impeller and diffuser stages, which the pump 122 may lift the downhole fluid such as oil or other hydrocarbons through the production tubing string 150 to storage tanks at the surface. The pump 122 may alternatively be a horizontal surface pump, progressive cavity pump, or an electric submersible progressive cavity pump. The motor 121 may use an induction motor driven by the VSD, which receives AC (alternating current) input power from an external source such as a generator (not shown in the figure) via an input line 111. The VSD rectifies the AC input power and then produces output power that is suitable to drive the motor 121. This output power is provided to the motor 121 via a drive output line 112, which runs down the wellbore 130 along the tubing string 150.

Figure 2:
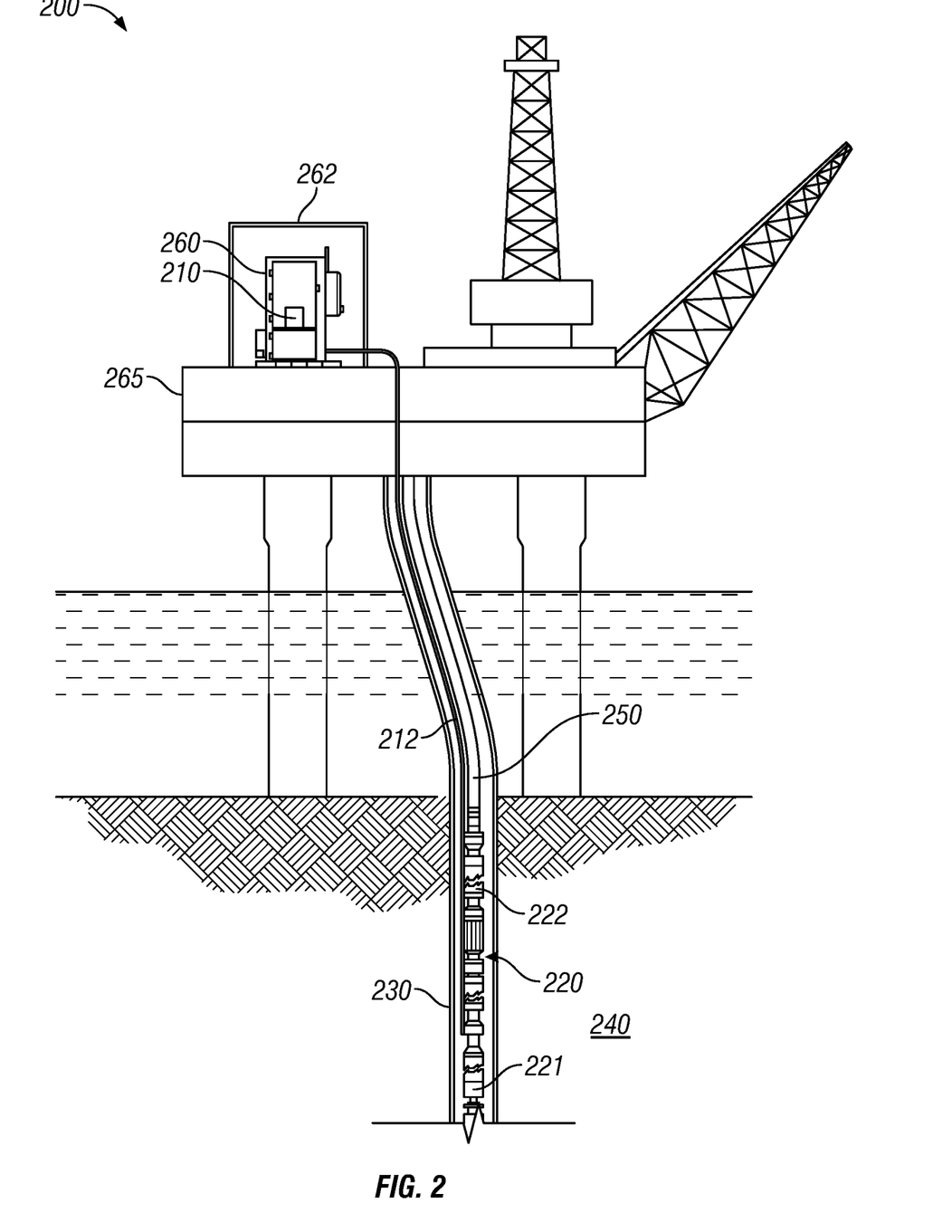
FIG. 2 is a schematic view of an offshore ESP system.

FIG. 2 illustrates an alternative system 200 for pumping downhole fluid in an offshore environment. Portions of the system 200 may be placed downhole in a wellbore 230, such as an oil well underground below the ocean. The system 200 includes a VSD 210 that includes a control system and may be placed in cabinet 260 inside control room 262 on offshore platform 265, such as an oil rig. The system 200 includes an ESP assembly 220 positioned within the wellbore 230 that has been drilled into an oil-bearing geological formation 240. The wellbore 230 is cased and is perforated at the lower end of the well to allow oil to flow from the formation 240 into the wellbore 230. A drive output line 212 extends from the VSD 210 to the ESP assembly 220 and may be up to 12,000 feet in length. The ESP assembly 220 may be towards the bottom of system 200, just above downhole sensors deep within the wellbore 230.

The ESP assembly 220 includes an electric motor 221 and may any suitable motor as described above. The motor 221 drives a pump 222 to lift downhole fluid such as oil or other hydrocarbons through production tubing 250 to storage tanks onboard offshore platform 265. The pump 222 may be any suitable pump as described above.

Figure 3:
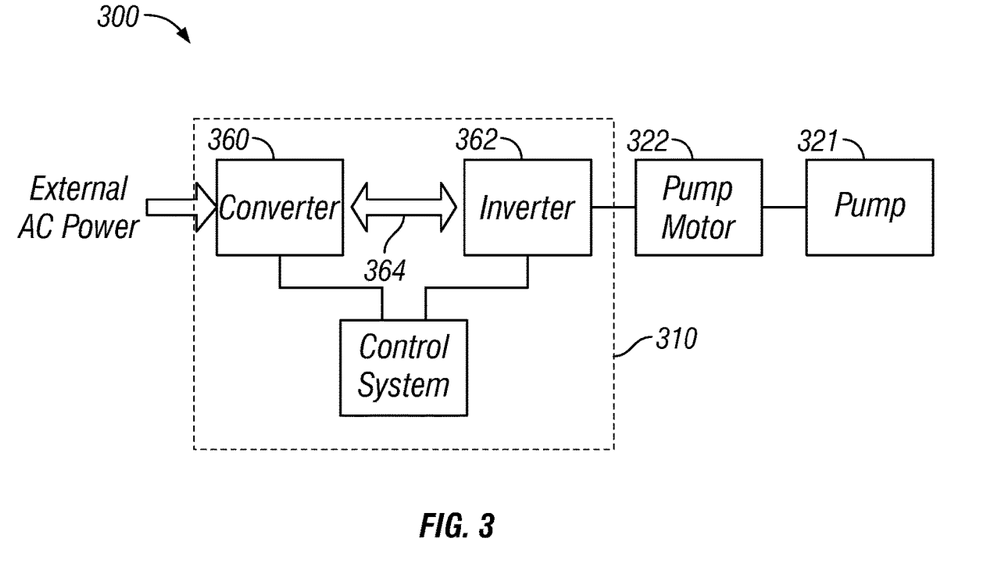
FIG. 3 is a functional block diagram illustrating the general structure of a system including a variable speed drive and pump.

Referring to FIG. 3, a functional block diagram illustrating the general structure of a system 300 including an example VSD 310 with a control system and an ESP assembly that includes a motor 321 and a pump 322 is shown. The VSD 310 includes a converter section 360 and an inverter section 362. The purpose of converter section 360 is to rectify the AC voltage received from the external power source. The converter section 360 generates DC power that is passed through an LC filter. The DC voltage generated by the converter section 360 charges a capacitor bank coupled to a bus 364 to a desired voltage. The desired voltage is achieved by controlling the operation of converter section 360. The voltage on the bus 364 is then used to drive the inverter section 362. The purpose of the inverter section 362 is to connect the bus voltage to the output terminals in prescribed manners to generate various output waveforms. The output power produced by the inverter section 362 may be filtered and then provided via an output line to the pump motor 321, which then drives pump 322.

The converter section 360 and the inverter section 362 operate according to control signals received from the VSD 310. For example, the VSD 310 determines the timing with which the silicon-controlled rectifiers (SCRs) of the converter section 360 are turned on or "fired." This timing determines when, and for how long, the external voltage on the input line is applied to the bus, and thereby controls the bus voltage. If the SCRs are turned on as soon as the input line voltage goes positive, the SCRs will be switched on for the maximum amount of time, causing the bus voltage to move toward its maximum. If the switching on of the SCRs is delayed, they will be switched on for less than the maximum amount of time, and a lower bus voltage will be achieved. The VSD 310 similarly controls the operation of inverter section 362. The VSD 310 selects the desired output mode (e.g., standard PWM mode, six-step mode, or hybrid mode) and adjusts the output voltage by varying appropriate factors. For instance, in the PWM mode, the bus voltage is set to maximum by firing the SCR at the earliest time and the output voltage is controlled by adjusting a scale factor of the output waveform called the modulation index. In the hybrid or six-step mode, the scale factor is set to 100%, and the output voltage is determined by the bus voltage that is controlled by the firing of the SCRs. In all three modes, the output frequency (and therefore the speed of the pump 322) is a function of the output voltage.

Another function of the VSD 310 is to implement algorithms and processes relating to interruption of the pump's operation. These algorithms and processes may implement procedures to restart the pump with minimal delay after operation of the pump is interrupted. It should be noted that the algorithms and processes need not be implemented in all embodiments. It should also be noted that the interruptions in the operation of the pump may result from various causes other than simply power interruptions.

Figure 4:
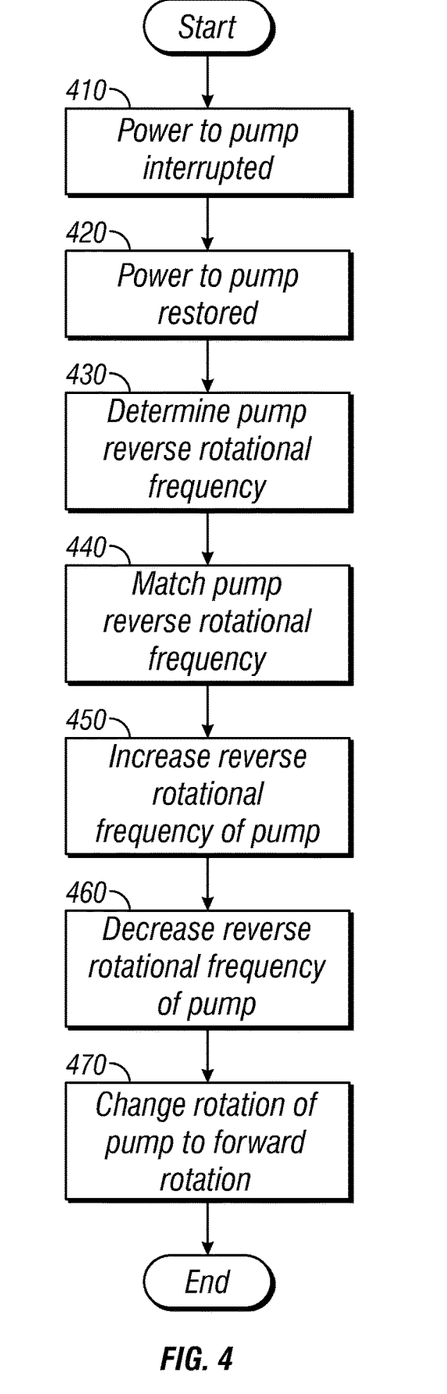
FIG. 4 is a flow diagram illustrating the determination of the pump speed and the subsequent restarting of the pump.

In each of the systems described above, the VSD detects an interruption of the input power. If the disruption on the input line is too long, it may be necessary to restart the pump. If a restart is needed, the VSD control system conducts a restart process to restart the pump with minimal delay after the interruption. Referring to FIG. 4, a flow diagram illustrating the determination of the pump speed and the subsequent restarting of the pump is shown. Initially, the variable speed drive is operating normally, receiving external AC power, converting this to DC power, and then generating output AC power at a voltage and frequency that are appropriate to drive the pump motor at a desired speed. At block 410, power to the variable speed drive is interrupted. It is assumed that the interruption is long enough that the drive cannot ride-through the interruption and maintain a suitable output voltage to continue to drive the pump motor. At some point, power is restored to the drive (block 420) and the drive's control system implements a process (beginning with block 430) to restart the pump with minimal delay.

When the VSD's control system determines that there has been an interruption (whether it to a power interruption or other causes) it must determine the speed of the pump's rotation, or the pump reverse rotational frequency. As noted above, the pump may not be able to develop sufficient torque to support the column of fluid in the wellbore if the fluid is draining too quickly back into the wellbore in a downhole direction and causing the pump to spin in reverse. It is therefore necessary to determine the pump reverse rotational frequency to initiate the restart process. To do so, the drive uses a phase locked loop (PLL). PLLs are control systems (e.g., circuits, digital systems, etc.) where an input signal is aligned in frequency to an output signal based on a relative difference of phase between the input signal and the output signal, i.e., by keeping the phase between the input signal and the output signal locked. The PLL includes a loop by which the output of the PLL can be fed back into the PLL to be compared with the input to the PLL. In an example PPL, the PLL may include an input voltage from the pump as a periodic signal representing the pump reverse rotational frequency. The input voltage from the pump is obtained by measuring the voltage generated by the pump during operation. The input voltage is inputted into a phase comparator, then passed through a loop filter such as a pass filter, and then inputted to a voltage-controlled oscillator. The oscillator generates an output voltage as a periodic signal, which is fed back to the phase detector. The phase detector compares the phase of the output signal with the phase of the input periodic signal, adjusting the oscillator to keep the phases matched. In this manner, the control system can match the phase of the input voltage and thus determine the pump reverse rotational frequency.

When the pump reverse rotational frequency has been determined, the control system drives the motor to match the reverse rotational frequency of the pump (block 440). To do so, the drive produces an output signal with a very low output voltage with the frequency slightly above, the detected reverse rotational frequency of the pump. Very low in this context includes as low as 5% and not more than 30% of the normal operating volts/Hz of the drive. Slightly above in this context includes between 0.01 to 12 Hz greater than the detected reverse rotational frequency in the same direction. For example, slightly above could include between 1 and 12 Hz greater. The output signal frequency may be determined or selected based on the depth of the well and the volume of fluid flowing back through the pump and limited by the maximum start frequency of the system. Then the drive increases the volts per hertz, for example linearly, thereby increasing the voltage of the output signal. Then the drive increases the frequency of the output signal driving the motor to match the reverse rotational frequency of the pump.

After the speed of the pump is matched, the control system drives the motor to accelerate the pump reverse rotational frequency (block 450) and thereby begin to pump downhole fluid in the uphole direction even though the pump is still rotating in reverse. For example, the control system may accelerate the pump reverse rotational frequency to 60 Hz.

After the drive is operating the motor and pump in the reverse rotational direction, the control system drives the pump motor to decrease the pump reverse rotational frequency while continuing to pump the downhole fluid in the uphole direction (block 460). The pump reverse rotational frequency may be decreased, for example linearly, thus preventing regeneration by the motor. The pump reverse rotational frequency continues to be lowered until the frequency is below a threshold pump reverse rotational frequency, which may be a threshold level at which the pump has sufficient torque to restore forward rotation of the pump and support the column of fluid in the wellbore flowing in the uphole direction.

It should be noted that the threshold frequency may either be a static value or a variable. Various factors that may affect the ability to restart the pump (which may vary from one case to another) may be considered and a corresponding threshold value calculated. If some of the factors are variable in a particular situation, the static value may be conservatively calculated by assuming the worst-case conditions for restarting the pump. Alternatively, the drive's control system may be configured to dynamically calculate the threshold value based upon existing conditions.

Once the pump is below the reverse rotational frequency threshold, the drive operates the motor to change the rotation of the downhole pump to a forward rotation at a pump forward rotational frequency to pump the downhole fluid in the uphole direction (block 470). After the pump restart process is complete, the drive system may increase the pump forward rotational frequency to the desired operating pump rotational frequency.

As noted above, the algorithm for determining the pump speed and restarting the pump is implemented in the control system of the drive. The control system may include any suitable type of data processor configured to execute the instructions of a control program, as well as some type of computer-readable medium for storing the instructions. It should also be noted that one embodiment of the invention may comprise the control program itself.

Examples of the above embodiments include the following numbered examples:

Example 1 is a method of restarting a downhole pump for pumping downhole fluid and located in a wellbore, comprising: determining a pump reverse rotational frequency of a downhole pump caused by downhole fluid flowing in a downhole direction using a phase locked loop, driving a pump motor at a motor reverse rotational frequency matching the pump reverse rotational frequency, driving the pump motor to accelerate the pump reverse rotational frequency and thereby pump the downhole fluid in an uphole direction, driving the pump motor to decrease the pump reverse rotational frequency while continuing to pump the downhole fluid in the uphole direction, and driving the pump motor to change the rotation of the downhole pump to a forward rotation at a pump forward rotational frequency to pump the downhole fluid in the uphole direction.

Example 2. The method of Example 1, wherein driving the pump motor at a reverse rotational frequency matching the pump reverse rotational frequency comprises producing an output signal with an output voltage at a frequency above the determined pump reverse rotational frequency, increasing the volts per hertz of the output signal thereby increasing the voltage of the output signal, and then increasing the frequency of the output signal to drive the motor to match the pump reverse rotational frequency.

Example 3. The method of Example 2, further comprising inputting a voltage generated by the pump representing the pump reverse rotational frequency into the phase locked loop.

Example 4. The method of Example 1, further comprising driving the pump motor to increase the pump forward rotational frequency.

Example 5. The method of Example 1, further comprising performing the method of claim 1 in response to detecting an interruption of operation of the downhole pump that requires the downhole pump to be restarted.

Example 6. The method of Example 5, wherein detecting the interruption of operation of the downhole pump comprises detecting an interruption of power to a variable speed drive coupled to the pump motor and operable to drive the pump motor.

Example 7. The method of Example 1, wherein driving the pump motor to change the rotation of the downhole pump to a forward rotation comprises determining whether the pump reverse rotational frequency is below a threshold pump reverse rotational frequency.

Example 8. The method of Example 1, further comprising driving the pump motor to change the rotation of the downhole pump to a forward rotation when the pump is rotating in reverse.

Example 9. A system for pumping downhole fluid in a wellbore, comprising: a downhole pump locatable downhole in the wellbore; a pump motor connected to drive the downhole pump; and a variable speed drive connected to the pump motor to operate the pump motor and comprising a control system operable to conduct a restart process comprising: determining a pump reverse rotational frequency of the downhole pump caused by downhole fluid flowing in a downhole direction using a phase locked loop; driving the pump motor at a motor reverse rotational frequency matching the pump reverse rotational frequency; driving the pump motor to accelerate the pump reverse rotational frequency to and thereby pump the downhole fluid in an uphole direction; driving the pump motor to decrease the pump reverse rotational frequency while continuing to pump the downhole fluid in the uphole direction; and driving the pump motor to change the rotation of the downhole pump to a forward rotation at a pump forward rotational frequency to pump the downhole fluid in the uphole direction.

Example 10. The system of Example 9, wherein driving the pump motor at a reverse rotational frequency matching the pump reverse rotational frequency comprises producing an output signal with an output voltage at a frequency above the determined pump reverse rotational frequency, increasing the volts per hertz of the output signal thereby increasing the voltage of the output signal, and then increasing the frequency of the output signal to drive the motor to match the pump reverse rotational frequency.

Example 11. The system of Example 10, wherein using the phase locked loop includes inputting a voltage generated by the pump representing the pump reverse rotational frequency.

Example 12. The system of Example 9, wherein the control system is further operable to drive the pump motor to increase the pump forward rotational frequency after conducting the restart process.

Example 13. The system of Example 9, wherein the control system is operable to conduct the restart process in response to detecting an interruption of the operation of the downhole pump that requires the downhole pump to be restarted.

Example 14. The system of Example 9, wherein driving the pump motor to change the rotation of the downhole pump to a forward rotation comprises determining whether the pump reverse rotational frequency is below a threshold pump reverse rotational frequency.

Example 15. The system of Example 9, wherein driving the pump motor to change the rotation of the downhole pump to a forward rotation further comprises driving the pump motor to change the rotation of the downhole pump when the pump is rotating in reverse.

Example 16. A device for pumping downhole fluid in a wellbore using a downhole pump locatable in the wellbore, comprising a variable speed drive connected to drive the downhole pump that comprises a control system operable to conduct a restart process comprising: determining a pump reverse rotational frequency of the downhole pump caused by downhole fluid flowing in a downhole direction using a phase locked loop; driving a pump motor at a motor reverse rotational frequency matching the pump reverse rotational frequency; driving the pump motor to accelerate the pump reverse rotational frequency to and thereby pump the downhole fluid in an uphole direction; driving the pump motor to decrease the pump reverse rotational frequency while continuing to pump the downhole fluid in the uphole direction; and driving the pump motor to change the rotation of the downhole pump to a forward rotation at a pump forward rotational frequency to pump the downhole fluid in the uphole direction.

Example 17. The device of Example 16, wherein driving the pump motor at a reverse rotational frequency matching the pump reverse rotational frequency comprises producing an output signal with an output voltage at a frequency above the determined pump reverse rotational frequency, increasing the volts per hertz of the output signal thereby increasing the voltage of the output signal, and then increasing the frequency of the output signal to drive the motor to match the pump reverse rotational frequency.

Example 18. The device of Example 16, wherein the control system is further operable to drive the pump motor to increase the pump forward rotational frequency after conducting the restart process.

Example 19. The method of Example 16, wherein driving the pump motor to change the rotation of the downhole pump to a forward rotation comprises determining whether the pump reverse rotational frequency is below a threshold pump reverse rotational frequency.

Example 20. The device of Example 16, wherein driving the pump motor to change the rotation of the downhole pump to a forward rotation further comprises driving the pump motor to change the rotation of the downhole pump when the pump is rotating in reverse.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

Those of skill will appreciate that some of the illustrative logical blocks, modules, circuits, and algorithm steps described in connection with the embodiments disclosed herein may be implemented as electronic hardware, computer software (including firmware) or combinations of both. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method of restarting a downhole pump for pumping downhole fluid and located in a wellbore after operation of the downhole pump in a forward rotation has ceased, the method comprising:
   determining a pump reverse rotational frequency of a downhole pump caused by downhole fluid flowing in a downhole direction to cause the downhole pump to rotate in a reverse rotational direction using a phase locked loop;
   driving a pump motor at a motor reverse rotational frequency matching the pump reverse rotational frequency;
   driving the pump motor to accelerate the pump reverse rotational frequency in the reverse rotation direction and thereby pump the downhole fluid in an uphole direction;
   driving the pump motor to decrease the pump reverse rotational frequency while continuing to pump the downhole fluid in the uphole direction; and
   driving the pump motor to change the rotation of the downhole pump to the forward rotation at a pump forward rotational frequency to pump the downhole fluid in the uphole direction.

2. The method of claim 1, wherein driving the pump motor at the reverse rotational frequency matching the pump reverse rotational frequency comprises producing an output signal with an output voltage at a frequency above the determined pump reverse rotational frequency, increasing the volts per hertz of the output signal thereby increasing the voltage of the output signal, and then increasing the frequency of the output signal to drive the motor to match the pump reverse rotational frequency.

3. The method of claim 2, further comprising inputting a voltage generated by the pump representing the pump reverse rotational frequency into the phase locked loop.

4. The method of claim 1, further comprising driving the pump motor to increase the pump forward rotational frequency.

5. The method of claim 1, further comprising performing the method of claim 1 in response to detecting an interruption of operation of the downhole pump that requires the downhole pump to be restarted.

6. The method of claim 5, wherein detecting the interruption of operation of the downhole pump comprises detecting an interruption of power to a variable speed drive coupled to the pump motor and operable to drive the pump motor.

7. The method of claim 1, wherein driving the pump motor to change the rotation of the downhole pump to a forward rotation comprises determining whether the pump reverse rotational frequency is below a threshold pump reverse rotational frequency.

8. The method of claim 1, further comprising driving the pump motor to change the rotation of the downhole pump to a forward rotation when the pump is rotating in reverse.

9. A system for pumping downhole fluid in a wellbore after operation of the downhole pump in a forward rotation has ceased, the system comprising:
   a downhole pump locatable downhole in the wellbore;
   a pump motor connected to drive the downhole pump; and
   a variable speed drive connected to the pump motor to operate the pump motor and comprising a control system operable to conduct a restart process comprising:
      determining a pump reverse rotational frequency of the downhole pump caused by downhole fluid flowing in a downhole direction to cause the downhole pump to rotate in a reverse rotational direction using a phase locked loop;
      driving the pump motor at a motor reverse rotational frequency matching the pump reverse rotational frequency;
      driving the pump motor to accelerate the pump reverse rotational frequency in the reverse rotation direction and thereby pump the downhole fluid in an uphole direction;
      driving the pump motor to decrease the pump reverse rotational frequency while continuing to pump the downhole fluid in the uphole direction; and
      driving the pump motor to change the rotation of the downhole pump to a forward rotation at a pump forward rotational frequency to pump the downhole fluid in the uphole direction.

10. The system of claim 9, wherein driving the pump motor at the reverse rotational frequency matching the pump reverse rotational frequency comprises producing an output signal with an output voltage at a frequency above the determined pump reverse rotational frequency, increasing the volts per hertz of the output signal thereby increasing the voltage of the output signal, and then increasing the frequency of the output signal to drive the motor to match the pump reverse rotational frequency.

11. The system of claim 10, wherein using the phase locked loop includes inputting a voltage generated by the pump representing the pump reverse rotational frequency.

12. The system of claim 9, wherein the control system is further operable to drive the pump motor to increase the pump forward rotational frequency after conducting the restart process.

13. The system of claim 9, wherein the control system is operable to conduct the restart process in response to detecting an interruption of the operation of the downhole pump that requires the downhole pump to be restarted.

14. The system of claim 9, wherein driving the pump motor to change the rotation of the downhole pump to a forward rotation comprises determining whether the pump reverse rotational frequency is below a threshold pump reverse rotational frequency.

15. The system of claim 9, wherein driving the pump motor to change the rotation of the downhole pump to a forward rotation further comprises driving the pump motor to change the rotation of the downhole pump when the pump is rotating in reverse.

16. A device for pumping downhole fluid in a wellbore using a downhole pump locatable in the wellbore, comprising a variable speed drive connected to drive the downhole pump that comprises a control system operable to conduct a restart process after operation of the downhole pump in a forward rotation has ceased, the process comprising:
   determining a pump reverse rotational frequency of the downhole pump caused by downhole fluid flowing in a downhole direction to cause the downhole pump to rotate in a reverse rotational direction using a phase locked loop;
   driving a pump motor at a motor reverse rotational frequency matching the pump reverse rotational frequency;
   driving the pump motor to accelerate the pump reverse rotational frequency in the reverse rotational direction and thereby pump the downhole fluid in an uphole direction;
   driving the pump motor to decrease the pump reverse rotational frequency while continuing to pump the downhole fluid in the uphole direction; and
   driving the pump motor to change the rotation of the downhole pump to a forward rotation at a pump forward rotational frequency to pump the downhole fluid in the uphole direction.

17. The device of claim 16, wherein driving the pump motor at the reverse rotational frequency matching the pump reverse rotational frequency comprises producing an output signal with an output voltage at a frequency above the determined pump reverse rotational frequency, increasing the volts per hertz of the output signal thereby increasing the voltage of the output signal, and then increasing the frequency of the output signal to drive the motor to match the pump reverse rotational frequency.

18. The device of claim 16, wherein the control system is further operable to drive the pump motor to increase the pump forward rotational frequency after conducting the restart process.

19. The method of claim 16, wherein driving the pump motor to change the rotation of the downhole pump to a forward rotation comprises determining whether the pump reverse rotational frequency is below a threshold pump reverse rotational frequency.

20. The device of claim 16, wherein driving the pump motor to change the rotation of the downhole pump to a forward rotation further comprises driving the pump motor to change the rotation of the downhole pump when the pump is rotating in reverse.

* * * * *